United States Patent [19]
Komoto et al.

[11] Patent Number: 4,932,486
[45] Date of Patent: Jun. 12, 1990

[54] ELECTRONIC BALANCE

[75] Inventors: Akira Komoto, Fujio Okumachi; Akira Nishio, Osaka, both of Japan

[73] Assignee: Shimadzu Corporation, Japan

[21] Appl. No.: 368,850

[22] Filed: Jun. 20, 1989

[30] Foreign Application Priority Data

Jun. 29, 1988 [JP] Japan .................. 63-161385
Dec. 16, 1988 [JP] Japan .................. 63-318211

[51] Int. Cl.⁵ .................. G01G 19/52; G01L 25/00
[52] U.S. Cl. .................. 177/50; 177/145; 73/1 B
[58] Field of Search .................. 177/50, 145; 73/1 B

[56] References Cited
U.S. PATENT DOCUMENTS 4,156,361 5/1979 Melcher et al. .................. 73/1 B
4,425,975 1/1984 Luchinger .................. 177/50
4,766,965 8/1988 Luchinger .................. 177/145 X Primary Examiner—George H. Miller, Jr.
Attorney, Agent, or Firm—Fidelman & Wolffe

[57] ABSTRACT

This invention provides an electronic balance comprising a housing; weighing means enclosed in the housing; a pan on which an object to be weighed is placed and having a space under the top plate thereof; a sensing member having one end connected to the weighing means and projecting out of the housing top wall, with the other end of the sensing member being connected to and supporting the pan outside the housing; a calibration weight arranged in the space under the pan; and operating means for loading and unloading the calibration weight on and from the sensing member. There are disclosed a variety of constructions of the operating means.

24 Claims, 16 Drawing Sheets

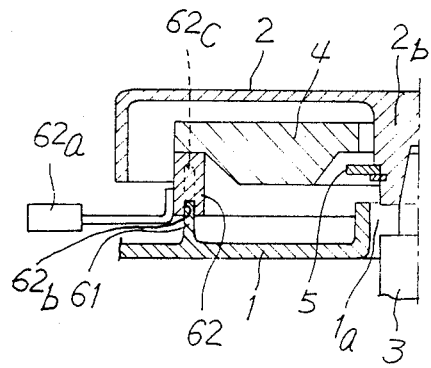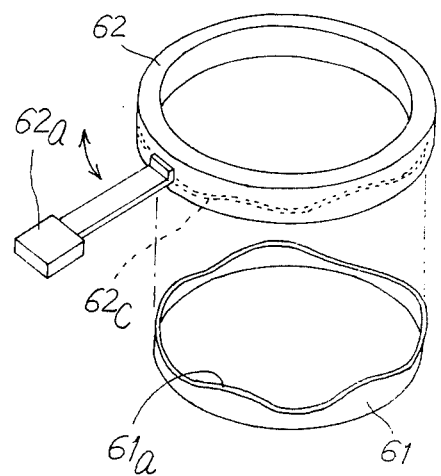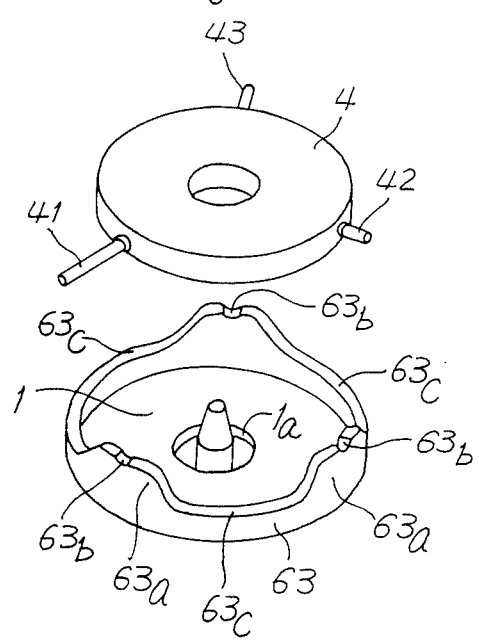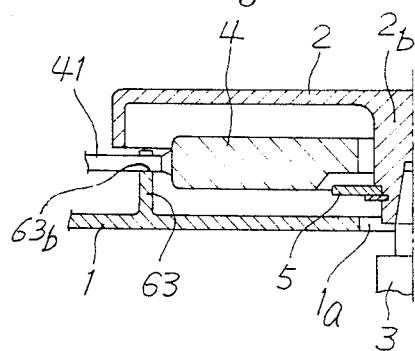

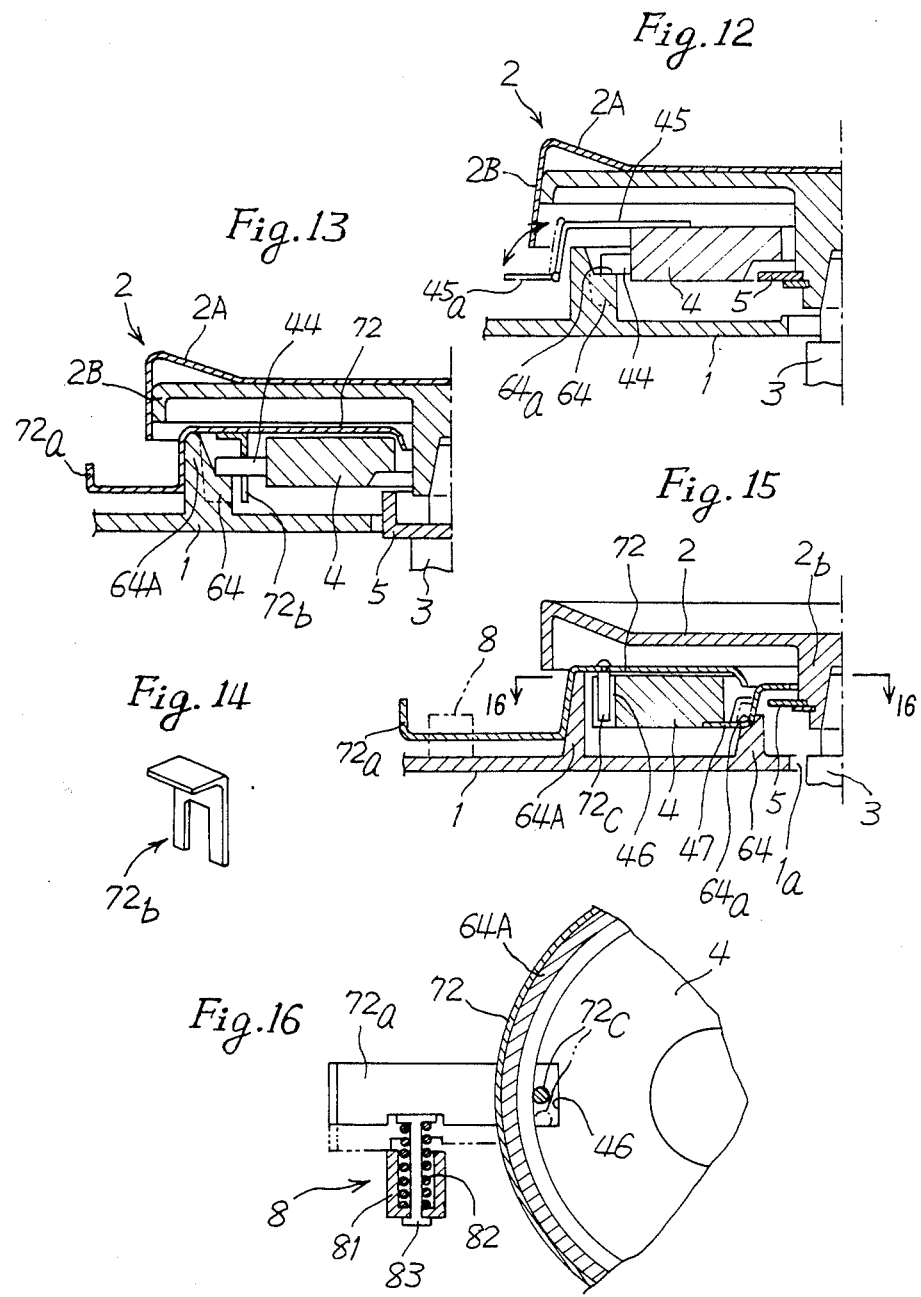

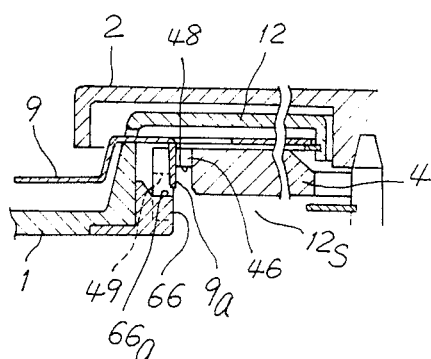
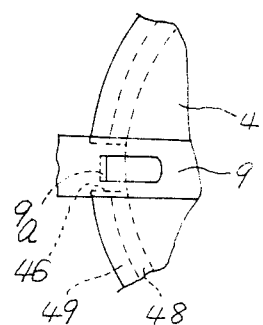
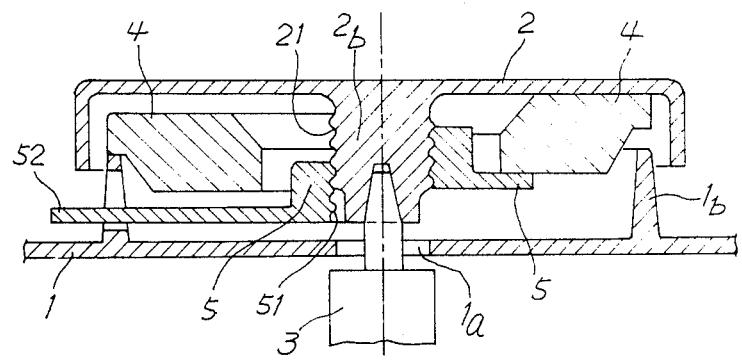
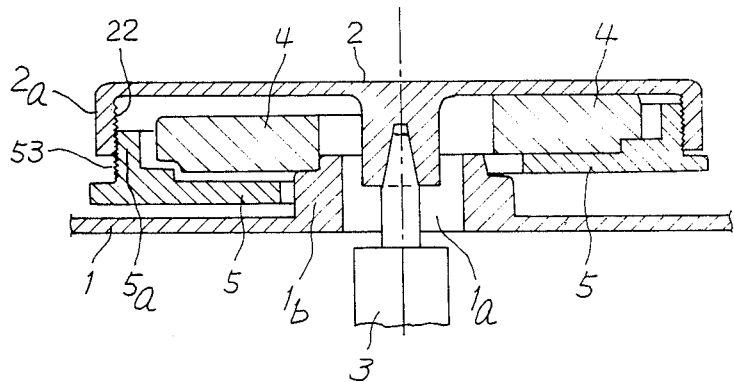

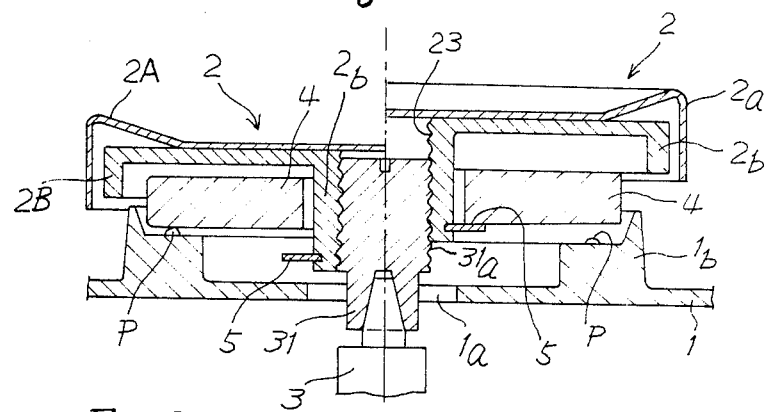
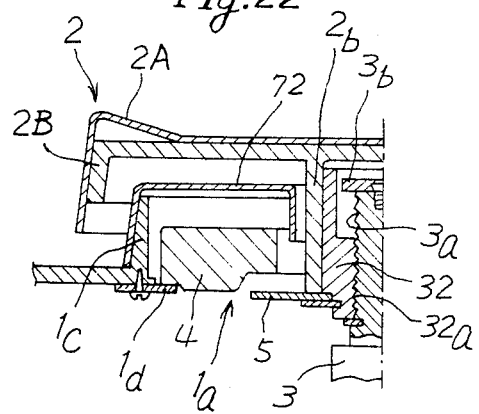
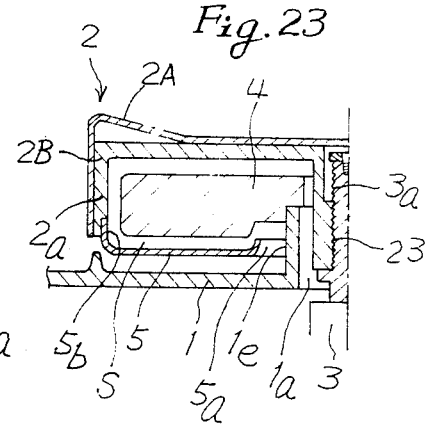
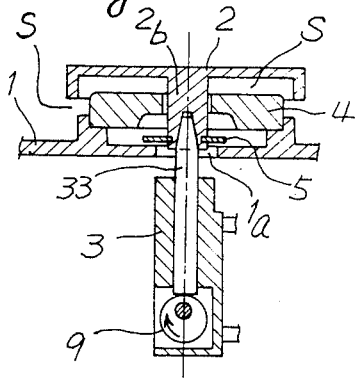
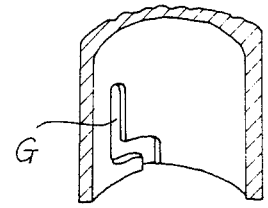

ELECTRONIC BALANCE

BACKGROUND OF THE INVENTION

This invention relates to an electronic balance provided with a built-in weight calibration of the balance.

Generally, in known electronic balances calibration is conducted by loading the weighing means including a load sensor with a weight of a known mass approximating that of an object to be measured, and changing or otherwise adjusting the calibration coefficient so as to make the measured value as displayed conform to the mass of the loaded weight. Such calibration is preferably conducted by the user of a balance not only when the balance is set but also as occasions demand or periodically so as to compensate for a span drift or other changes caused by the change of the component parts of a balance that occurs as time passes.

To make the above operation of calibration easy, there has been proposed an electronic balance which has a built-in calibration weight within its housing so as to enable calibration without the necessity of providing a separate precision calibration weight. To have a built-in calibration weight, the housing of a balance must have a large space to accommodate the calibration weight and a mechanism for loading and unloading the weight on and from the weighing means. The mechanism, however, is complicated in contruction and expensive, thereby increasing the cost of the balance. A balance of a large weighing capacity would require a large calibration weight having a large volume, so that it would be practically difficult to provide in the housing a space sufficient for the calibration weight and the associated mechanism.

There has also been proposed a method for calibrating a balance of a large weighing capacity with a calibration weight of a small mass. This method, however, necessarily involves changes in the lever ratio by shocks in transporting the balance or the atmospheric temperature, with resulting deterioration of the accuracy of calibration.

SUMMARY OF THE INVENTION

Accordingly, the primary object of the invention is to provide an electronic balance which can have a calibration weight of a greater mass than in the prior art built in the housing thereof without the necessity of providing a large space therein.

The above object is attained in accordance with the invention by providing an electronic balance which includes, as shown in FIGS. 1A and 1B, a housing 1, weighing means not shown but enclosed in the housing, a pan 2 on which an object to be weighed is placed, a sensing member 3 connected to the pan and the weighing means, a calibration weight 4 provided in a space S formed between the pan 2 and the upper wall of the housing 1, and a mechanism for loading the calibration weight 4 on the pan or a weight receiver 5 provided adjacent the upper end of the sensing member 3 and unloading the weight therefrom.

Instead of the space S for the calibration weight 4 provided between the pan 2 and the upper wall of the housing 1, a space 12s may be formed by protruding a portion of the upper wall of the housing into the upwardly convex recess under the pan to enclose the calibration weight therein as shown in FIG. 5.

The pan 2 may either be made of a single member or comprise a body 2B and a cover 2A as shown in FIG. 3.

When an ordinary measurement is to be conducted, the built-in calibration weight must be kept out of contact with the sensing member of the weighing means and the pan or any other sensitive portions connected thereto, and when correction is to be made, the calibration weight must be put on the weighing means while being kept out of contact with all the other component parts of the balance. It is preferable to put the calibration weight directly on the center of the sensing member without the intermediary of a lever or the like member.

The calibration weight may be made annular in shape so as to be able to be put on the pan 2 or the weight receiver 5 provided adjacent the upper end of the sensing member in a space between the pan and the upper surface of the housing, whereby it is possible to use a calibration weight of a large volume without interfering with the weighing means within the housing or without increasing the size of the housing.

By providing a calibration weight within a space 12s formed in the housing by protruding a portion of the upper wall thereof into the upwardly convex recess under the pan as shown in FIG. 5, it is also possible to use a calibration weight of a large volume.

With a portion of the upper wall of the housing 1 protruded into the upwardly convex recess under the pan 2 to form an additional space in the housing, it is possible to arrange in the space a calibration weight of a larger volume than otherwise without taking into consideration interference of the weight with the other component parts and without the necessity of increasing the volume of the housing except for the protuding portion.

The invention further provides an electronic balance which includes, as shown in FIGS. 27A and 27B, a housing 1, weighing means 100 enclosed in the housing, a pan 2 on which an object to be weighed is placed, a calibration weight 4 disposed in a space under the pan, and a plurality of sensing members $3_1 \sim 3_4$ connected to the weighing means and projecting out of the housing.

In a first operative condition for weighing an object, the pan is supported on the projecting top ends of the sensing members, with the calibration weight being kept out of contact with the pan and the sensing members, so that the object placed on the pan is weighed. In a second condition for calibration of the balance, both the pan and the calibration weight are supported on the sensing members, with one of the pan and the calibration weight being held by the other, so that the total mass of the pan and the calibration weight is detected by the weighing means.

The pan together with the calibration weight is shifted from one of the first and second conditions to the other by lifting them up from on the sensing members, then displacing, rotating or reversing them, and then again putting them on the sensing members by hand.

BRIEF DESCRIPTION OF THE DRAWINGS

FIG. 8 is a view similar to FIG. 2 showing a sixth embodiment of the invention;

FIG. 9 is an exploded perspective view of a portion of FIG. 8;

FIG. 10 is a view similar to FIG. 2 showing a seventh embodiment of the invention;

FIG. 11 is an exploded perspective view of a portion of FIG. 10;

FIG. 12 is a view similar to FIG. 2 showing an eighth embodiment of the invention;

FIG. 13 is a view similar to FIG. 2 showing a ninth embodiment of the invention;

FIG. 14 is a perspective view of a fork-like member used in the device of FIG. 13;

FIG. 15 is a view similar to FIG. 2 showing a tenth embodiment of the invention;

FIG. 16 is a cross-sectional view taken along line 16—16 in FIG. 15;

FIG. 17 is a view similar to FIG. 2 showing an eleventh embodiment of the invention;

FIG. 18 is a plan view of a portion of the calibration weight shown in FIG. 17;

FIG. 19 is a view similar to FIG. 1A showing a twelfth embodiment of the invention, the left-hand and right-hand halves of the drawing showing the device in two different operative condition, respectively;

FIG. 20 is a view similar to FIG. 19 showing a thirteenth embodiment of the invention;

FIG. 21 is a view similar to FIG. 19 showing a fourteenth embodiment of the invention;

FIG. 22 is a view similar to FIG. 2 showing a fifteenth embodiment of the invention;

FIG. 23 is a view similar to FIG. 2 showing a sixteenth embodiment of the invention;

FIG. 24 is a fragmentary perspective view of a modified form of a member used in the device of the invention;

FIG. 25 is a view similar to FIG. 1A showing a seventeenth embodiment of the invention;

EMBODIMENTS OF THE INVENTION

Preferred embodiments of the invention will be described below with reference to the accompanying drawings.

Figure 1A:
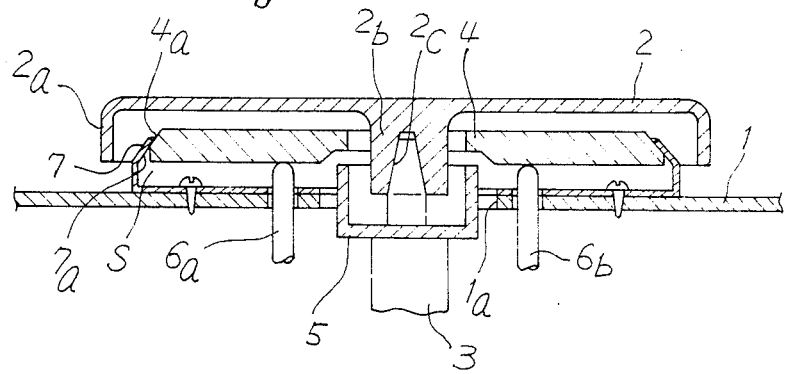
FIG. 1A is a central vertical section of one embodiment of the invention.
Figure 1B:
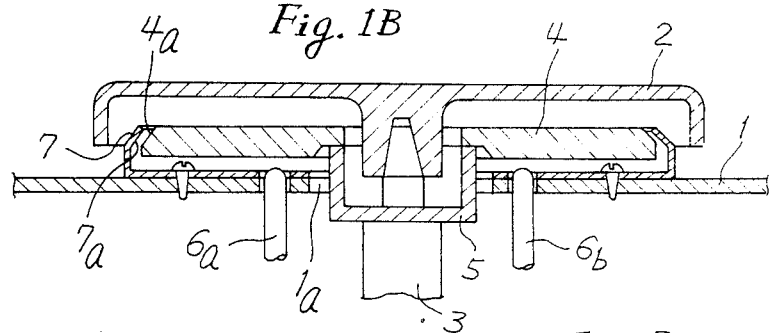
FIG. 1B is a view similar to FIG. 1A showng the device in a different operative condition.

FIGS. 1A and 1B show in central vertical section one embodiment of the invention in a first position in which ordinary measurement is to be conducted, and in a second position in which a calibration weight is loaded on the weighing means.

There is shown a housing 1, in which a well-known weighing device including a load sensor, not shown, such as an electromagnetic force balancing mechanism is provided so as to detect a load acting on a sensing member 3 connected to the load sensor.

The sensing member 3 stands upright with its upper end portion projecting outside the housing 1 through an opening 1a formed in the upper wall thereof. A pan 2 is supported on the top end of the sensing member 3, with a cup-shaped weight receiver 5 being fixed to the sensing member 3 adjacent the top end thereof.

The pan 2 is a disk-like member having a circumferential skirt 2a formed by bending a peripheral portion thereof downwardly, and a central boss 2b formed on the under surface thereof and having a central bore 2c into which the top end of the sensing member 3 is fitted. Between the under surface of the pan 2 and the upper wall of the housing 1 there is formed a space S in which an annular calibration weight 4 is disposed concentrically with the axis of the sensing member 3.

Within the housing there are provided a plurality of push rods, two of which are shown as at 6a and 6b in FIGS. 1A and 1B, which are moved up and down by means of a well-known simple driving mechanism such as a cam or a crank mechanism.

In the highest position as shown in FIG. 1A, the push rods 6a and 6b have their top ends abutting on the under surface of the calibration weight 4, so that the weight is held between a weight stopper 7 and the push rods. The weight stopper 7 has a downwardly flaring circumferential surface 7a against which the corresponding tapered circumferential surface 4a of the calibration weight 4 is urged, with the center of the weight 4 coinciding with the axis of the sensing member 3 when the weight 4 is pushed upwardly by the push rods 6a and 6b. Under the condition, the weight 4 is kept out of contact with the pan 2, the sensing member 3 and the weight receiver 5, and only the object placed on the pan is weighed by the weighing means connected to the sensing member 3.

Under the condition that the push rods 6a and 6b are at their lowest position, they are out of contact with the calibration weight 4 as shown in FIG. 1B. In particular, in their lowest position the top ends of the push rods 6a and 6b are below the upper end of the weight receiver 5, so that the weight 4 rests on the weight receiver 5.

Under the condition, the weight 4 is out of contact with the stopper 7, and the whole mass of the weight 4 is transmitted to the weighing means through the weight receiver 5 and the sensing member 3.

Figure 2:
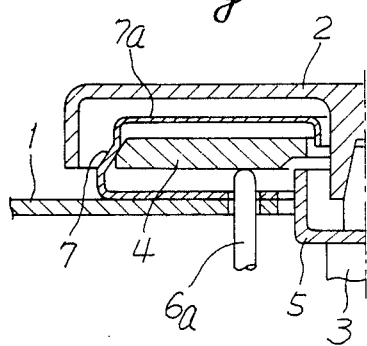
FIG. 2 is a view similar to FIG. 1A showing a half of a second embodiment of the invention.

FIG. 2 shows a modified form of the embodiment of FIG. 1 with a dustproof arrangement. The same reference numerals and symbols in FIGS. 1 and 2 and the other figures designate corresponding component parts.

In the embodiment of FIG. 2 the weight stopper 7 is provided with an inverted saucer-shaped cover portion 7a extending over the calibration weight 4. The arrangement helps prevent the calibration weight 4 from being soiled by dusts in the ambient atmosphere and/or the material scattered or overflown from a sample on the pan.

Figure 3:
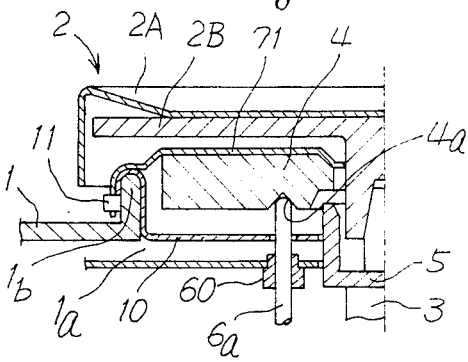
FIG. 3 is a view similar to FIG. 2 showing a third embodiment of the invention.

A modified form of the dustproof arrangement of FIG. 2 is shown in FIG. 3. This embodiment is of great utility with due consideration given to workability in assembling the component parts. In this embodiment, the pan 2 is of a two-part type comprising a body 2B and a cover 2A.

The housing 1 is provided in the upper wall thereof with an enlarged opening 1a, which is closed by a lower dust cover 10, over which an upper dust cover 71 functioning also as a weight stopper is provided to define between the upper and lower covers a space to accommodate a calibration weight 4. A push rod 6a is shown piercing a rod guide 60 and the lower dust cover 10 so as to move the calibration weight 4 up and down.

In the under surface of the calibration weight 4 there is formed a circular groove 4a, in which the top ends of the push rods, only one of which is shown at 6a, engage to determine the position of the weight 4 relative to the axis of the sensing member 3.

Figures 4A, 4B:
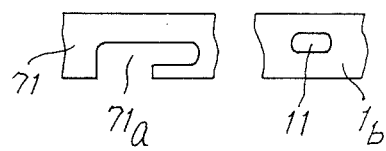
FIG. 4A is an elevational view of a part of FIG. 3.
FIG. 4B is an elevational view of another part of FIG. 3.

To fix the upper dust cover 71 to the housing 1, there is formed on the peripheral edge of the opening 1a an upright circumferential wall 1b, on the outer lateral surface of which there are provided a plurality of projections, only one of which is shown at 11 in FIGS. 3 and 4B, and the upper cover 71 is provided with a corresponding number of L-shaped slots, only one of which is shown at 71a in FIG. 4A. By putting the upper cover 71 on the upright wall 1b with the projections 11 engaging in the slots 71a and turning the upper cover 71 relative to the wall 1b, it is possible to mount the upper cover 71 onto the wall 1b quickly. The lower cover 10 may also be of a construction similar to that of the upper cover.

Figure 5:
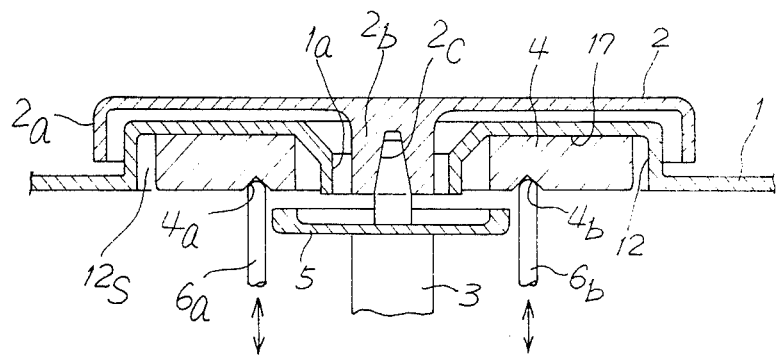
FIG. 5 is a view similar to FIG. 1A showing a fourth embodiment of the invention.

FIG. 5 shows an embodiment in which the upper wall of the housing 1 is so constructed as to function in the same manner as both the weight stopper 7 in FIG. 1 and the dust cover 7a in FIG. 2. The portion 12 of the upper wall of the housing 1 which is under the pan 2 is so shaped as to project upward into the recess of the pan thereby to form a space 12s, in which an annular calibration weight 4 is provided. As the push rods 6a and 6b are moved upward, they raise the weight 4 into contact with the under surface 17 of the projecting portion 12 of the housing upper wall. In other words, the under surface 17 serves as a stopper for the calibration weight 4. When the push rods 6a and 6b are moved downward to their lowest position, the weight 4 is lowered to rest on the weight receiver 5 fixed to the sensing member 3 adjacent the top end thereof as in the embodiment of FIG. 1. The positioning of the calibration weight 4 with respect to the axis of the sensing member 3 is effected by engagement of the top ends of the push rods 6a and 6b in the groove or holes 4a and 4b formed in the under surface of the weight 4.

In the embodiment of FIG. 5, since the calibration weight 4 is disposed in the space 12s formed in the upper portion of the interior space of the housing by the projecting portion 12 of the upper wall of the housing, it is possible to use a calibration weight of a large volume without the necessity of taking into consideration interference of the weight with the weighing means and other parts inside the housing 1 and without the necessity of enlarging the volume of the housing except for the projecting portion 12. In addition, since the housing 1 itself serves as a weight stopper and a dust cover for the calibration weight, the number of the component parts is reduced.

Figure 6:
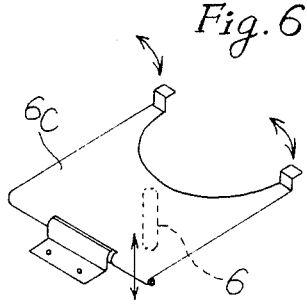
FIG. 6 is a perspective view of a component part of the device of the invention.

In the previously described embodiments, three or more push rods may be provided, or if a fork-like lever 6c as shown in FIG. 6 is used, as single push rod 6 may suffice to move the calibration weight up and down.

With the cover 71 and the groove 4a in the under surface of the calibration weight 4, it is possible to move the weight 4 up and down by a single push rod 6a. If the position of the single push rod with respect to the weight is so eccentric that it is difficult to move the weight smoothly, the weight may be made of a semi-annular shape or a portion of the weight is cut away to compensate for the eccentric position of the push rod.

Figure 7:
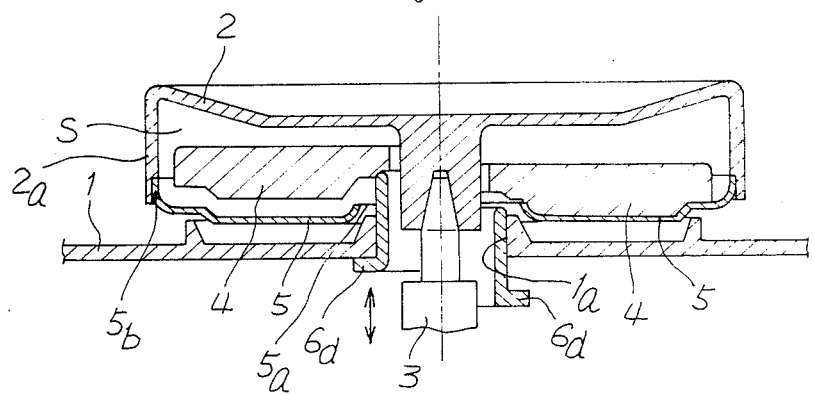
FIG. 7 is a view similar to FIG. 1A showing a fifth embodiment of the invention.

FIG. 7 shows an embodiment in which the pan 2 is provided with a weight receiver 5, and the calibration weight 4 is enclosed in a space S formed in the pan. The weight receiver 5 is a saucer-like member having a central opening 5a. The pan 2 has a skirt portion 2a, into which the corresponding peripheral portion 5b of the weight receiver 5 is fitted to define under the pan 2 the space S in which the weight 4 is enclosed.

A hollow cylindrical pusher 6d is provided in the housing 1 so as to be movable up and down through the opening 1a formed in the upper wall of the housing and the central opening 5a of the weight receiver 5. Under the ordinary condition for measurement the calibration weight 4 is supported by the pusher 6d only so as to rest thereon. When the balance is to be loaded with the calibration weight 4, the pusher 6d is lowered as far as the weight 4 rests on the weight receiver 5 alone. As in FIGS. 1, 3 and 5, the arrangement of FIG. 7 has an advantage that it can prevent the calibration weight 4 from being contaminated or dirtied.

FIG. 8 shows an embodiment in which the mechanism for moving the calibration weight 4 up and down is simplified and provided outside the housing 1. In particular, the upper wall of the housing 1 is provided with an opening 1a and an upright circumferential wall 61 concentric with the opening 1a. The upper surface of the wall 61 is undulated as shown at 61a in FIG. 9, and a weight supporting ring 62 is rotatably mounted on the upright wall 61. The ring 62 is provided in the under surface thereof with a downwardly open groove 62b, the bottom of which has an undulation 62c complementary to the undulated edge surface 61a of the upright wall 61. The supporting ring 62 is provided with a radially outwardly projecting handle 62a. As the ring 62 is turned by the handle, the ring 62 is raised or lowered due to engagement of the complementary undulations 61a and 62a.

A calibration weight 4 is mounted on the ring 62, and a weight receiver 5 is fixed to the boss 2b of the pan 2.

In this embodiment, at the raised position of the weight supporting ring 62 the calibration weight 4 supported thereon is kept out of contact with the pan 2, the sensing member 3 and the weight receiver 5. When the weight supporting ring 62 is turned by the handle 62a so as to be lowered, the weight 4 is lowered to rest on the weight receiver 5. When the weight supporting ring 62 has reached the lowest position, the weight 4 contacts the weight receiver 5 alone so that the whole mass of the weight is transmitted to the sensing member 3.

In the arrangements of FIGS. 10 through 18, the calibration weight 4 itself is turned to move downward or upward thereby to effect loading or unloading of the weight on or from the weight receiver.

In the embodiment shown in FIGS. 10 and 11, the upper wall of the housing 1 is provided with an opening 1a and an upright circumferential weight supporting wall 63 concentric with the opening 1a. The upper surface of the upright wall 63 is provided with a plurality, say, three waves or hills 63a spaced an equal angle from each other circumferentially of the wall 63, and a notch 63b formed on top of each of the waves. The calibration weight 4 is provided with a plurality, say, three pins 41, 42 and 43 radially outwardly extending from the circumferential surface thereof so as to be engageable in the notches 63b in a manner to be described below. The pin 41 is longer than the other pins 42 and 43 so as to serve as a handle.

Under the normal condition for measurement, the weight 4 is supported by the weight supporting wall 63 with the pins 41, 42 and 43 engaging in the notches 63b as shown in FIG. 10. As the weight 4 is turned by the pin 41, the weight gradually descends with the pins 41, 42 and 43 sliding on the curved upper surface of the supporting wall 63 as far as the weight 4 rests on the weight receiver 5 fixed to the boss 2b of the pan 2. The depth of the valleys 63 c between the waves 63a is so determined that under the condition that the weight 4 rests on the weight receiver 5, the pins 41, 42 and 43 do not contact the supporting wall 63.

A modified form of the embodiment of FIGS. 10 and 11 is shown in FIG. 12, wherein on the upper surface of the top wall of the housing 1 there is formed an upright circumferential weight supporting wall 64 having a similar wavy upper surface 64a, and the calibration weight 4 is provided with a plurality of pins, only one of which is shown at 44, extending radially outwardly from the circumferential surface of the weight. Extending radially outwardly from the weight over the weight supporting wall 64 is an arm 45 for use as a handle having an outer free end portion 45a foldable upon itself so as to be able to be put under the pan 2 while not in use. The arrangement has an advantage that the handle 45 is not obstructive to operation of measurement. When measurement is to be conducted, the outer end portion 45a of the handle 45 can easily be extended out of the pan 2.

A modified form of the arrangement for turning the calibration weight 4 is shown in FIG. 13. This embodiment also has an upright circumferential weight supporting wall 64 on the upper wall of the housing 1 and a plurality of pins, only one of which is shown at 44, on the weight, with the wall and the pins being of substantially the same construction as in FIG. 12. The embodiment includes a dust cover 72 for the calibration weight, which is turned by means of a handle 72a projecting from the cover 72. The cover 72 is rotatably supported by a circumferential cover supporting wall 64A formed integrally with the weight supporting wall 64. A fork-like member 72b as shown in FIG. 14 is fixed to the under surface of the cover 72. The pin 44 on the weight 4 engages in the slot of the fork-like member 72b. As the cover 72 is rotated by the handle 72a, the fork-like member 72b rotates the weight 4 through the pin 44 thereby to move the weight up or down. Preferably, there are provided three fork-like members 72b and three pins 44.

The slot of the fork-like member 72b must be of a width slightly greater than the outer diameter of the pin 44, so that when the weight 4 has been put on the weight receiver 5, the dust cover 72 may be turned slightly in the reverse direction thereby to disengage the fork-like member 72b from the pin 44.

FIGS. 15 and 16 show an embodiment in which the engagement between the calibration weight 4 and the dust cover 72 and the mechanism for moving the weight up and down are modified, with addition of a mechanism for semi-automatically effecting the above-mentioned slight reverse rotation of the dust cover 72. FIG. 15 is a central vertical section and FIG. 16 is a transverse section of a portion of FIG. 15 taken along line 16—16 immediately above the upper surface of the calibration weight.

In this embodiment the calibration weight 4 is provided in the circumferential surface thereof with a plurality, say, three recesses, only one of which is shown at 46, and the dust cover 72 is provided on the under surface thereof with a plurality, say, three pins, only one of which is shown at 72c and which engage in the recesses 46, respectively. The cover 72 is rotatably supported by an upright circumferential cover supporting wall 64A as in the embodiment of FIG. 13, and provided with a radially outwardly projecting arm 72a, by which the cover 72 is rotated, with the pin 72c contacting the inner lateral surface of the recess 46 as shown by a double-dot-and-dash line circle in FIG. 16.

The rotation of the weight 4 is translated into its upward or downward movement by an undulated member 47 fixed to the inner periphery of the annular weight 4 and an upright circumferential weight supporting wall 64 provided in cooperative relation to the undulated member 47. In particular, the weight supporting wall 64 is formed about the opening 1a of the housing top wall and having an undulated upper surface 64a, which cooperates with the corresponding undulation of the member 47 to raise or lower the calibration weight 4 as it is turned. When the calibration weight 4 is lowered, the undulated member 47 and the weight 4 rests on the weight receiver 5 fixed to the central boss 2b of the pan 2.

The mechanism for effecting the previously described slight reverse rotation of the dust cover 72 is designated by the reference numeral 8 and comprises a cylinder 81, a piston 83 reciprocative therein and a compression coil spring 82 interposed between the piston 82 and the end wall of the cylinder 81, with the outer end of the piston 83 being so arranged as to be contacted by one side of the handle 72a of the dust cover 72 when the handle is turned. The mechanism 8 is so arranged relative to the handle 72a that when the calibration weight 4 has been rotated by the handle 72a so as to be put on the weight receiver 5, the handle 72a pushes the piston 83 into the cylinder 81, compressing the spring 82, with the pin 72c on the dust cover 72 having been brought into contact with one lateral side of the recess 46 in the weight 4 as shown in double-dot-and-dash line in FIG. 16.

Under the condition, when the handle 72a is released, the resiliency of the compressed spring 82 causes the piston 83 to project from the cylinder to push the handle 72a back thereby to turn the cover 72 slightly in the reverse direction, so that the pin 72c on the cover 72 disengages from the weight 4. With this arrangement, when the operator of the balance pushes the piston 83 by the handle 72a to turn and put the weight 4 on the weight receiver 5 and then releases the handle, the cover 72 is automatically turned a minute angle in the reverse direction, leaving only the weight 4 on the weight receiver 5 so that the mass of the weight 4 is transmitted onto the sensing member 3 of the balance.

FIGS. 17 and 18 show an embodiment, wherein the housing 1 has a projecting portion 12 which defines in the under recess of the pan 2 a space 12s for accommodating the calibration weight 4 as in the embodiment of FIG. 5, and wherein the weight 4 is turned so as to be moved downward or upward for loading or unloading the weight on or from the weighing means of the balance.

The embodiment includes a rotatable member 9 provided with a tongue 9a for turning the weight 4, and the weight 4 in the space 12s of the projecting portion 12 of the housing is provided with a recess 46 in which the tongue 9a engages. Inside the projecting portion 12 of the housing there is provided an annular weight supporting member 66 having an undulated upper surface 66a. In the under surface of the weight 4 adjacent the periphery thereof there is formed a circumferential groove 48, and the under surface of the peripheral portion of the weight 4 radially outward of the circumferential groove 48 is undulated as at 49. The undulated under surface 49 slidably rides on the opposite undulated upper surface 66a of the weight supporting member 66, so that as the weight 4 is rotated, it is raised or lowered in accordance with the phasic relation between the two undulated surfaces 49 and 66a.

FIGS. 19 and 20 show in central vertical section two embodiments in each of which a weight receiving member 5 is so arranged as to be movable upward or downward to put a calibration weight 4 on the weighing means of the balance or remove it therefrom. The left-hand half of each of the figures shows the component parts in an ordinary condition for measurement, while the right-hand half thereof shows the sensing member loaded with the calibration weight.

In the embodiment of FIG. 19, the pan 2 has a central boss 2b externally threaded as at 21, and the weight receiver 5 has a central through bore internally threaded as at 51 and an arm 52 extending under the pan 2 and the weight 4 radially outwardly thereof. The threads 21 and 51 engage each other. As the weight receiver 5 is rotated relative to the pan 2 by the handle arm 52, the receiver 5 moves up or down relative to the pan 2.

In this embodiment, an upright circumferential wall 1b is formed on the upper surface of the top wall of the housing 1 concentrically with an opening 1a formed therein so as to serve as a weight support. Under the condition that the weight receiver 5 is at the lowest position, the calibration weight 4 rests on the weight support 1b without contacting the weight receiver 5 or any other component parts of the balance. To load the weighing means with the calibration weight, the weight receiver 5 is raised as far as the weight is lifted out of contact with the weight support 1b and sandwiched between the weight receiver 5 and the under surface of the pan 2, so that the weight 4 is combined with the pan 2 and its whole mass is applied to the sensing member 3 of the weighing means.

In the embodiment of FIG. 20, the pan 2 has a skirt portion 2a internally threaded as at 22, and the weight receiver 5 is a circular plate having an upright circumferential wall 5a externally threaded as at 53. The threads 22 and 53 engage each other, so that the weight receiver 5 is movable up and down relative to the pan 2. In this embodiment, the weight support 1b comprises a boss-like member having a through bore and so formed as to surround the opening 1a in the upper wall of the housing 1. As in the embodiment of FIG. 19, while the weight receiver 5 is at its lowest position, the calibration weight 4 rests on the weight support 1b. As the weight receiver 5 is rotated, the weight 4 is raised out of contact with the weight support 1b and comes to be sandwiched between the pan 2 and the weight receiver 5 so as to be combined with the pan 2.

In the embodiments of FIGS. 19 and 20, the mechanism for loading and unloading a weight on and from the weighing means of the balance is much simplified and can be provided outside the housing, and the number of the component parts is reduced. The mechanism is easy to manufacture or assemble and hardly gets out of order. Under the condition that the weight receiver 5 is at its raised position, the weight 4 is tightly locked between the pan 2 and the weight receiver 5, so that the mechanism can be used as locking means for the weight when the balance is transported. In the embodiment of FIG. 20, the weight receiver 5 functions also as a dust cover.

In the embodiment of FIGS. 19 and 20, by making the threads 21, 51 and 22, 53 multiple threads or helicoidal it is possible to increase the amount of upward or downward movement per unit angle of rotation thereby to improve the efficiency of operation.

In the embodiments illustrated in FIGS. 21 through 25, the pan 2 is moved up or down relative to the sensing member 3 so as to put the weight 4 on the sensing member 3 or remove the weight 4 from the sensing member 3.

In the embodiment of FIG. 21, a pan support 31 is mounted on the top end of the sensing member 3 of the weighing means and externally threaded as at 31a. The pan 2 comprises a cover 2A and a body 2B having a central boss 2b internally threaded as at 23. The pan support 31 engages in the boss 2b so that the sensing member 3 supports the pan 2 through the intermediary of the support 31. With this arrangement, by rotating the pan 2 and the support 31 relative to each other it is possible to raise or lower the pan relative to the sensing member 3. A weight receiver 5 is fixed to the outer circumferential surface of the boss 2b of the pan 2.

In this embodiment, a weight support 1b is provided on the upper surface of the top wall of the housing 1 in the form of an upright circumferential wall concentric with an opening 1a formed in the top wall. A plurality, say, three projections, only two of which are shown at P, are provided on the upper surface of the weight support 1b, so that when the pan 2 is lowered relative to the sensing member 3, the calibration weight 4 rests on the projections P. As the pan 2 is raised relative to the sensing member 3, the weight 4 comes to rest on the weight receiver 5 so that the sensing member 3 is loaded with the weight 4. By having two of the projections P connected electrically it is possible to electrically detect the loading and unloading of the weight.

FIG. 22 illustrates an embodiment in which the arrangement of FIG. 21 is made dustproof and the mechanism for moving the pan up and down is more suitable for practical use.

In this embodiment, the top wall of the housing 1 is provided with an opening 1a of a greater diameter than that of the corresponding opening 1a in the embodiment of FIG. 21, and about the opening 1a there is formed an upright circumferential wall 1c for supporting a dust cover 72. A plurality of weight supporting members, only one of which is shown at 1d, are fixed to the inner circumferential surface of the wall 1c so as to project radially inwardly of the opening 1a. The calibration weight 4 is arranged under the dust cover 72 so as to be supported by the supporting members 1d under the normal condition for measurement.

The pan 2 has a central boss 2b into which a hollow cylindrical pan supporting member 32 internally threaded as at 32a is fitted, with an annular weight receiver 5 fixed to the outer circumferential surface of the pan supporting member 32. The top end portion of the sensing member 3 is externally threaded as at 3a and screwed into the internally threaded pan supporting member 32, so that the pan 2 is supported by the sensing member 3.

As the pan 2 is rotated, the pan supporting member 32 moves upward or downward relative to the sensing member 3 thereby to move the pan 2 and the weight supporting member 5 upward or downward, and when they are move upward, the calibration weight 4 comes to rest on the weight receiver 5.

A stopper 3b is fixed to the top end of the sensing member 3 so as to limit the upward movement of the pan supporting member 32 thereby to prevent the pan 2 from falling off the sensing member 3.

FIG. 23 shows an embodiment which is so arranged as to be dustproof as in the embodiment of FIG. 22. In FIG. 23, however, the weight receiver 5 is so shaped and arranged as to serve as a dust cover.

In particular, as in the embodiment of FIG. 21 the body 2B of the pan 2 has a central boss 2b internally threaded as at 23, and the upper end portion of the sensing member 3 is externally threaded as at 3a as in the embodiment of FIG. 22. The threads 3a and 23 engage each other, so that as the pan 2 is rotated, it moves upward or downward relative to the sensing member 3. As in the embodiment of FIG. 7, the weight receiver 5 is a saucer-like member having a central opening 5a, and the body 2B of the pan 2 has a skirt portion 2a, into which the upright peripheral portion 5b of the weight receiver 5 is fitted to define under the pan a space S in which the calibration weight 4 is enclosed. In this embodiment, the weight support for supporting the calibration weight under a normal condition for measurement can be an upright circumferential wall 1e surrounding the opening 1a formed in the upper surface of the top wall of the housing 1.

In the mechanisms for moving the pan 2 up and down relative to the pan support 31 in FIG. 21, the pan support 32 relative to the sensing member 3 in FIG. 22, and the pan 2 relative to the sensing member 3 in FIG. 23, the screws may be of a multiple-thread type, or be replaced by helicoids. In a modified form, one of the two members 32(or 2b) and 3 may be provided with an L-shaped guide slot G as shown in FIG. 24, with the other member being provided with a projection engaging in the slot, so that when the pan 2 or the pan support 32 is lifted and then turned a little, the projection sliding in the slot G comes to the horizontal portion of the slot G thereby to hold the pan 2 or the support 32 at the raised position.

In a further modified form of the invention a linear ratchet mechanism of a knock type may be employed, so that the pan is lifted up to a predetermined position and locked there, and when the pan is again lifted a little from the locked position and then released, it can be lowered.

FIG. 25 shows an embodiment in which the upward and downward movement of the pan 2 relative to the sensing member 3 is effected by providing the sensing member 3 with a movable pan supporting shaft 33. In particular, the member 3 includes an eccentric cam 9 which supports the shaft 33 in such a manner that as the cam is rotated, it moves the shaft 33 and the pan 2 on top of the shaft up or down. The pan 2 has a central boss 2b to which a weight receiver 5 is fixed outside the housing 1, with a calibration weight 4 being disposed in a space S between pan 2 and the upper wall of the housing 1.

The mechanism of this embodiment is a little complicated. By driving the cam 9 electrically by operating a switch it is possible to improve the efficiency of operation of loading and unloading the calibration weight.

In the embodiments above described, the pan 2 is circular, but it may also be rectangular or of any other shape. With a rectangular pan, it is preferable to use a calibration weight of a rectangular shape so as to make the best use of the space between the pan and the housing upper wall.

Figure 26A:
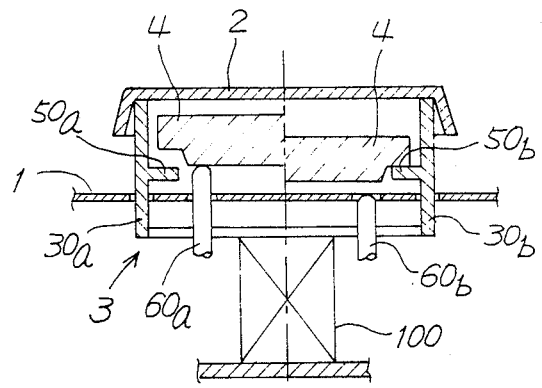
FIG. 26A is a vertical section of an eighteenth embodiment of the invention taken along line 26A—26A in FIG. 26B.
Figure 26B:
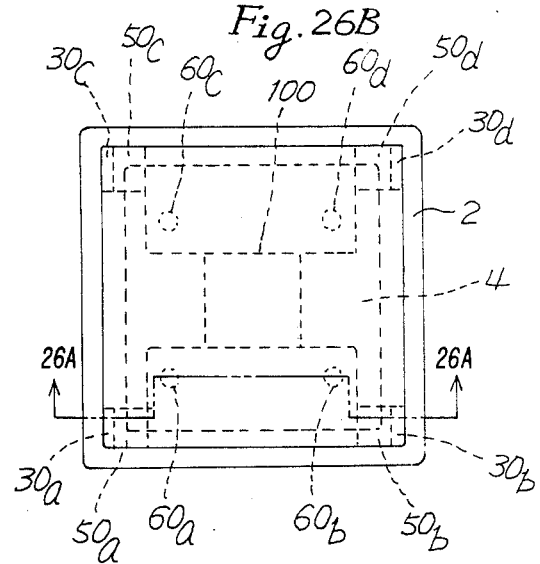
FIG. 26B is a top plan view of the device of FIG. 26A.

In a large-sized electronic balance, by providing a plurality of sensing members to support the pan it is possible to place the calibration weight between the pan and the upper wall of the housing without making the weight of an annular shape. The arrangement is shown by way of example in FIGS. 26A and 26B. FIG. 26A is a vertical section taken along line 26A—26A in FIG. 26B, which is a plan view.

In this embodiment, the sensing member 3 connected to a weighing section 100 has four supports 30a, 30b, 30c and 30d arranged at the four corners of a square. The supports project through the upper wall of the housing 1 to support the pan 2 on top thereof. A rectangular calibration weight 4 is provided inside the square defined by the four supports 30a–30d and between the pan 2 and the upper wall of the housing 1. Four push rods 60a, 60b, 60c and 60d are ganged together to move the calibration weight 4 up and down. The supports 30a–30d are provided with weight receivers 50a, 50b, 50c and 50d, respectively. While the push rods 60a–60d are at their lowest position, the weight 4 rests on the weight receivers 50a–50d, so that the whole mass of the weight is transmitted to the weighing section 100. Under the ordinary condition for measurement, the push rods 60a–60d are raised to their uppermost position so that the weight 4 is supported by the push rods alone and does not contact any other component parts of the mechanism.

FIGS. 27 through 34 show those embodiments in which the calibration weight 4 is loaded on and unloaded from the weighing means of a balance without providing a particular mechanism for loading and unloading the calibration weight.

Figure 27A:
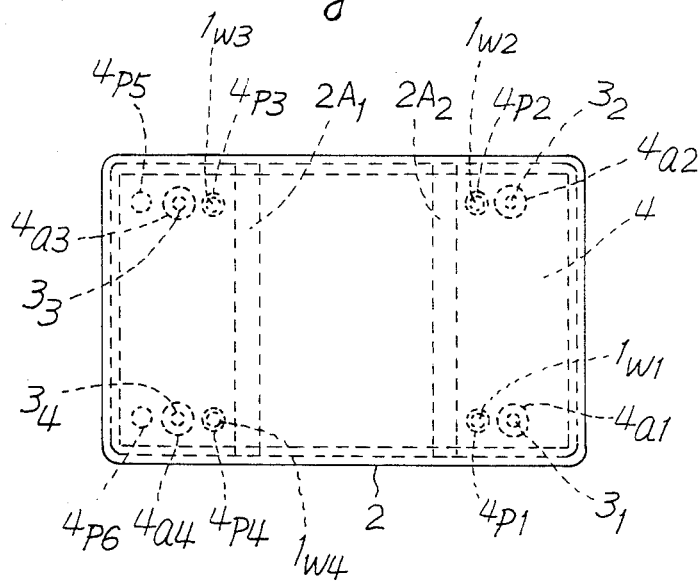
FIG. 27A is a top plan view of a nineteenth embodiment of the invention.
Figure 27B:
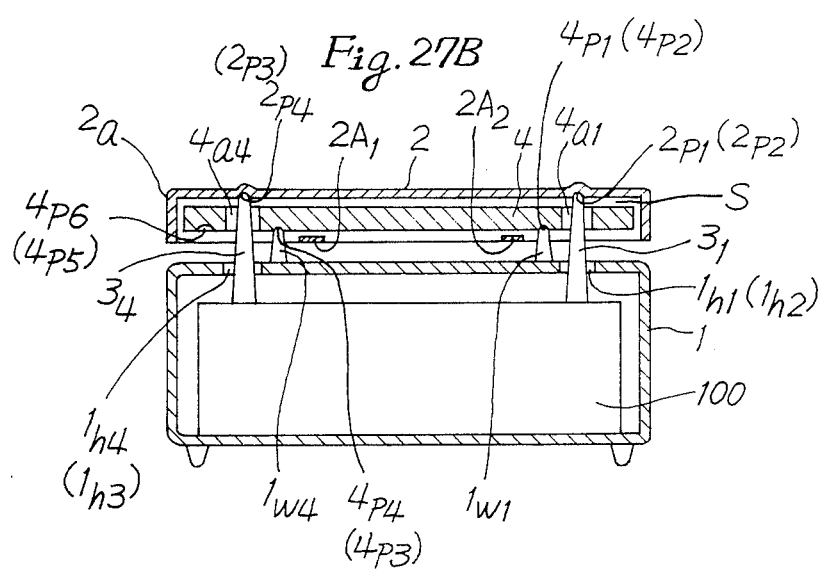
FIG. 27B is a vertical section of the device of FIG. 27A.

In FIGS. 27A and 27B the housing 1 of the balance encloses a weighing section 100 to which a plurality, say, four sensing members $3_1$, $3_2$, $3_3$ and $3_4$ are connected so that the weighing section can weigh a load acting on the sensing members. The sensing members stand upright projecting through holes $1h_1$, $1h_2$, $1h_3$ and $1h_4$ formed in the top wall of the housing. A pan 2 on which an object to be weighed is placed is supported by the top ends of the sensing members $3_1$–$3_4$. The pan 2 is rectangular in shape and has a peripheral portion bent downward to form a skirt portion 2a, and in the inner or under surface of the pan there are formed a plurality, say, four small pits $2p_1$, $2p_2$, $2p_3$ and $2p_4$ in which the top ends of the sensing members $3_1$–$3_4$ engage for proper positioning of the pan 2 relative to the sensing members. The pan 2 has a pair of cross bars $2A_1$ and $2A_2$ fixed to the lower edge of the skirt portion 2a.

A calibration weight 4 in the form of a rectangular plate is disposed in a space S within the skirt portion 2a of the pan 2 above the cross bars $2A_1$ and $2A_2$ and supported by four weight supports $1w_1$, $1w_2$, $1w_3$ and $1w_4$, so that the weight does not contact the pan or the cross bars. The weight 4 is provided with holes $4a_1$, $4a_2$, $4a_3$ and $4a_4$ through which the sensing members $3_1$–$3_4$ pass, so that the weight does not contact the sensing members, either.

Figure 28A:
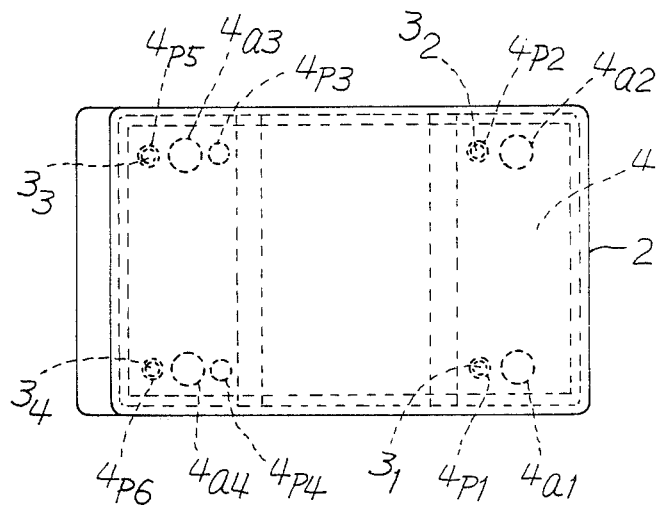
FIG. 28A is a view similar to FIG. 27A showing the device in a different operative condition.
Figure 28B:
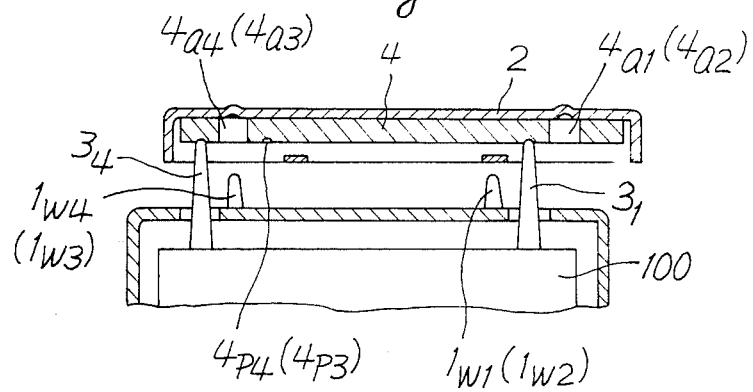
FIG. 28B is a vertical section of the device of FIG. 28A.

On the under surface of the weight 4 there are formed four pits $4p_1$–$4p_4$ for positioning the weight 4 relative to the weight supports $1w_1$–$1w_4$, and an additional pair of pits $4p_5$ and $4p_6$ adjacent the left-hand end of the weight, or at the left side of the left-hand pair of pits $4p_3$ and $4p_4$ as shown in FIGS. 27A and 27B. The positions of the additional pair of pits $4p_5$ and $4p_6$ and the right-hand pair of pits $4p_1$ and $4p_2$ conform to the positions of the four sensing members $3_1$ to $3_4$, so that the weight can be displaced rightward and supported by the four sensing members whose top ends engage in the pits $4p_1$, $4p_2$, $4p_5$ and $4p_6$ of the weight, respectively, as shown in FIGS. 28A and 28B.

Under the condition shown in FIGS. 27A and 27B, the calibration weight 4 is held out of contact with the pan 2 and the sensing members $3_1$ to $3_4$ so that the mass of the object on the pan is detected by the weighing section 100.

The correction procedure will now be described. Under the condition shown in FIGS. 27A and 27B, the pan 2 is raised by an operator, whereupon the cross bars $2A_1$ and $2A_2$ contact the under surface of the weight 4, so that the pan and the weight are raised together. When the pan and the weight have been raised above the level of the top ends of the sensing members $3_1$ to $3_4$, the pan 2 with the weight 4 held therein is displaced to the right as shown in FIGS. 28A and 28B, and the weight with the pan thereon is put on the sensing members $3_1$ to $3_4$, with the top ends thereof engaging in the pits $4p_1$, $4p_2$, $4p_5$ and $4p_6$, respectively. Under the condition, the weight 4 is not in contact with the weight supports $1w_1$ to $1w_4$, so that the total mass of the pan 2 and the weight 4 is applied to the weighing section 100 through the sensing members $3_1$ to $3_4$. Calibration of the balance is then conducted in a known manner.

The cross bars $2A_1$ and $2A_2$ for holding the weight may be omitted. In that case, when the operator raises the pan 2, he must hold the pan and the weight with his fingers under the weight to prevent it from falling down.

Figure 29:
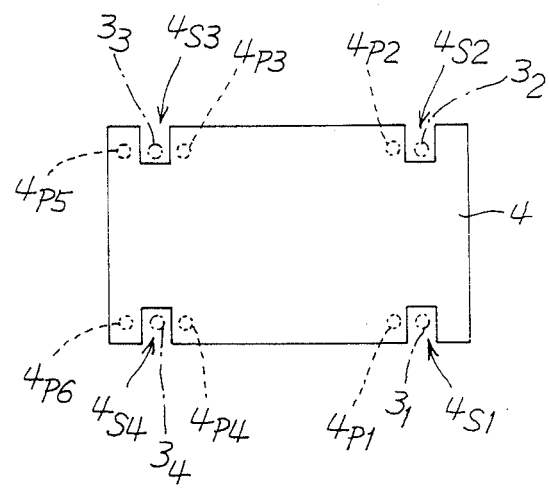
FIG. 29 is a modified form of the calibration weight used in the device shown in FIGS. 27A to 28B.

Instead of the holes $4a_1$ to $4a_4$, the calibration weight 4 may have four slots $4s_1$ to $4s_4$ corresponding to the four sensing members $3_1$ to $3_4$ as shown in FIG. 29.

Instead of the pits $2p_1$ to $2p_4$ in the pan and the pits $4p_1$ to $4p_6$ in the weight, cap-like members may be fixed to the under surfaces of the pan and the weight for the same purpose.

Figure 30A:
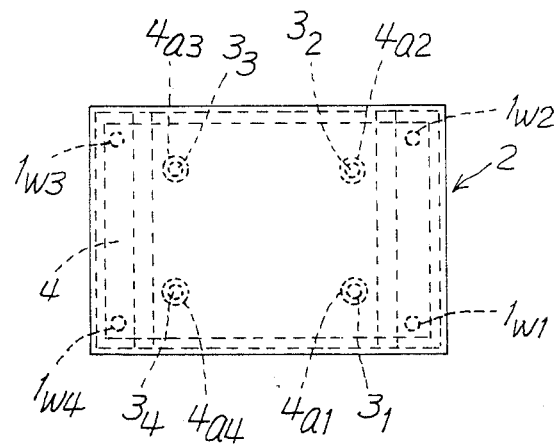
FIGS. 30A, 30B, 31A and 31B are views similar to FIGS. 27A, 27B, 28A and 28B, respectively, showing a twentieth embodiment of the invention.
Figure 30B:
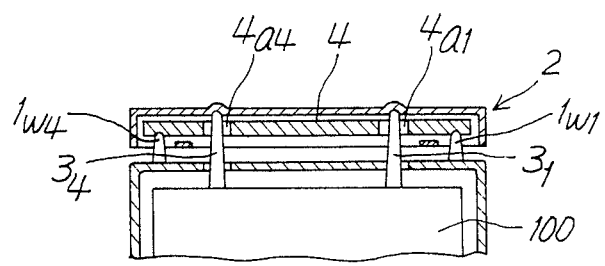
Figure 31A:
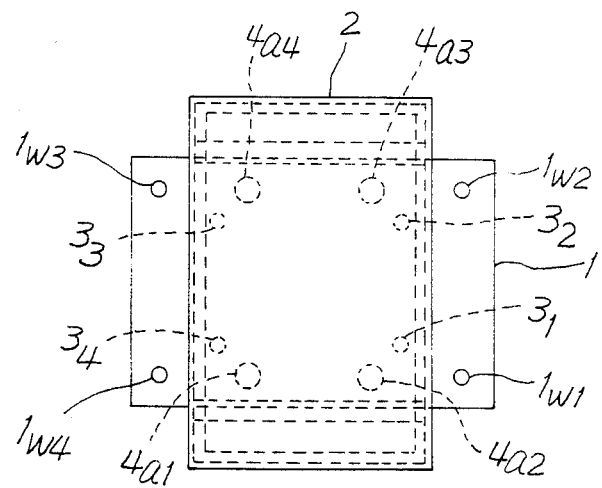
Figure 31B:
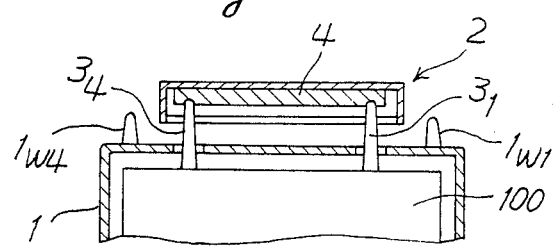
Figure 32A:
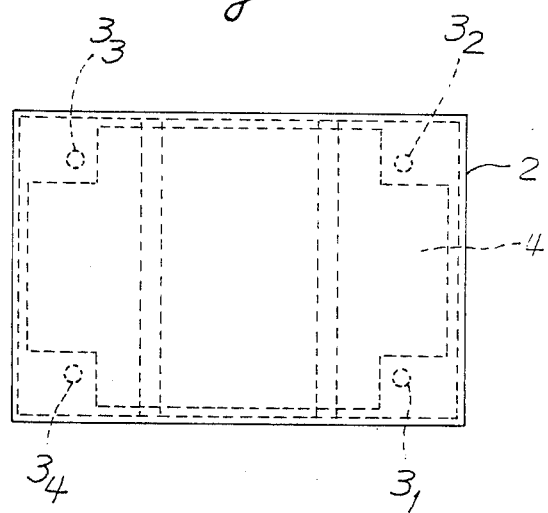
FIGS. 32A, 32B, 33A and 33B are views similar to FIGS. 27A, 27B, 28A and 28B, respectively, showing a twenty-first embodiment of the invention.
Figure 32B:
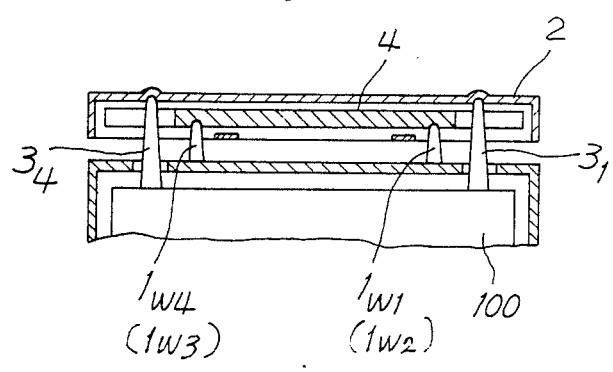
Figure 33A:
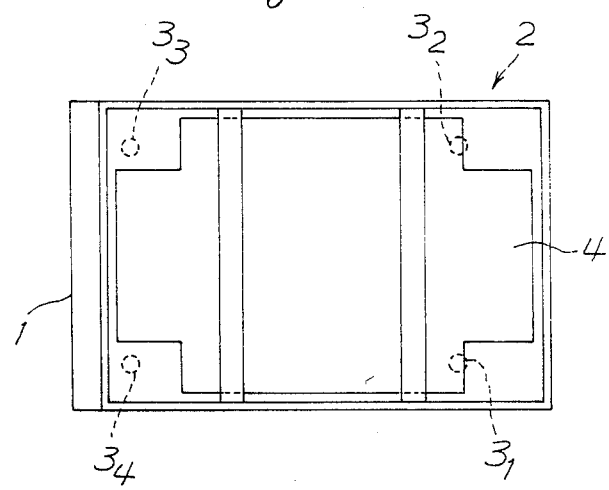
Figure 33B:
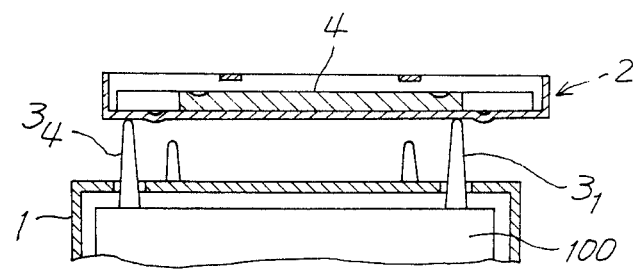

FIGS. 30A and 30B show a different embodiment of the invention, wherein the sensing members $3_1$ to $3_4$ are arranged at the four corners of a rectangle so that when the pan 2 with the calibration weight 4 is raised from on top of the sensing members $3_1$ to $3_4$ and turned 90°, the through holes $4a_1$ to $4a_4$ formed in the weight do not coincide with the sensing members $3_1$ to $3_4$. Under the condition, when the pan with the weight is lowered onto the sensing members, the weight is pushed by the sensing members against the under surface of the pan, so that the total mass of the pan and the weight is loaded on the weighing section 100 through the sensing members $3_1$ to $3_4$ as shown in FIG. 31B.

In this embodiment, the angle through which the pan is to be turned for loading the weight on the sensing members is 90°. It may also be any other angle such as, for example, 30°, 45°, etc., with the sensing members $3_1$ to $3_4$ being arranged at the four corners of a square.

The embodiment of FIGS. 32A, 32B, 33A and 33B is of the same construction as that of FIGS. 27A to 28B except that instead of the through holes $4a_1$ to $4a_4$ in FIGS. 27A to 28A, the calibration weight 4 has its four corners cut away to allow the sensing members $3_1$ to $3_4$ to pass through the weight. Under the condition shown in FIGS. 32A and 32B, the weight 4 is held by the weight supports $1w_1$ to $1w_4$ out of contact with the sensing members $3_1$ to $3_4$. To load the weight on the sensing members, the pan 2 and the weight 4 are raised from the position shown in FIGS. 32A and 32B, turned over, and put on the sensing members $3_1$ to $3_4$, so that the pan turned upside down with the weight 4 thereon rests on the sensing members $3_1$ to $3_4$, causing the total mass of the pan and the weight to be loaded on the weighing section 100 through the sensing members.

Figure 34:
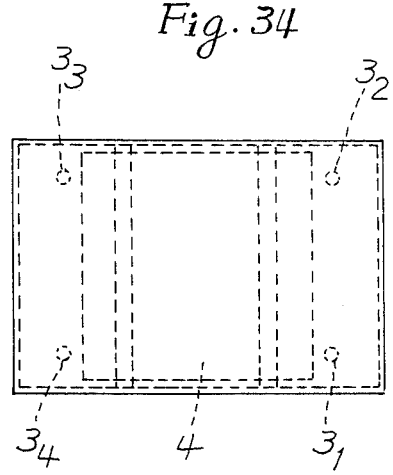
FIG. 34 is a view similar to FIG. 27A showing a modified form of the calibration weight.

FIG. 34 shows a modified form of the calibration weight which can be used in place of the weight shown in FIGS. 32A, 32B, 33A and 33B. The weight 4 has neither holes, pits, nor recesses.

Figure 35A:
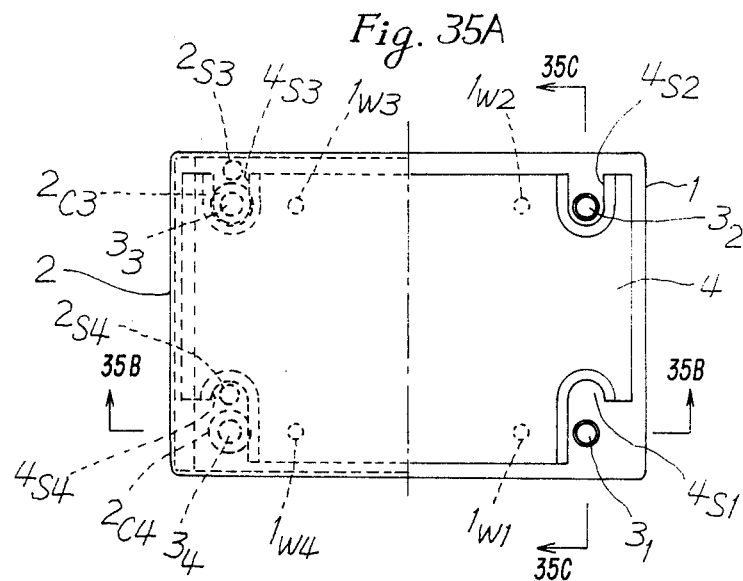
FIG. 35A is a top plan view of a twenty-second embodiment of the invention.

A modified form of the embodiment of FIGS. 27A, 27B, 28A and 28B is shown in FIGS. 35A, 35B, 35C and 36. The right-hand half of FIG. 35A is shown without the pan 2. In this embodiment the calibration weight 4 is provided with two pairs of slots $4s_1$, $4s_2$, $4s_3$, $4s_4$ corresponding to the four sensing members $3_1$ to $3_4$. On the inside surface of the pan 2 there are provided two pairs of cap-like members $2c_1$, $2c_2$ and $2c_3$, $2c_4$ corresponding to the four sensing members $3_1$ to $3_4$, and two pairs of studs $2s_1$, $2s_2$ and $2s_3$, $2s_4$ displaced from the cap-like members widthwise of the pan 2. The distance between each pair of studs $2s_1$ and $2s_2$ ($2s_3$ and $2s_4$) is equal to the distance between the corresponding pair of sensing members $3_1$ and $3_2$ ($3_3$ and $3_4$). The pan 2 has a skirt portion 2a, the lower edge portions of the opposite sides of which are bent inward to form an opposite pair of shelves $2i$.

Figure 35B:
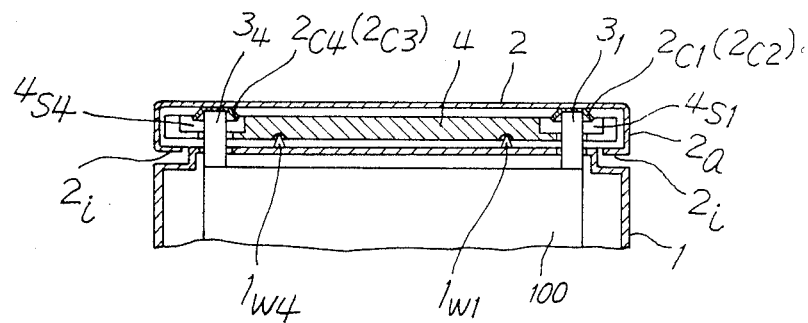
FIG. 35B and 35C are sectional views taken along lines 35B—35B and 35C—35C, respectively, in FIG. 35A.
Figure 35C:
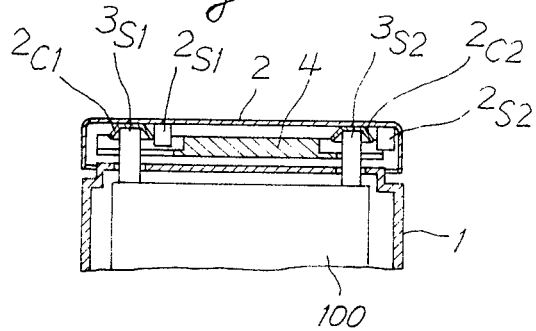
Figure 36:
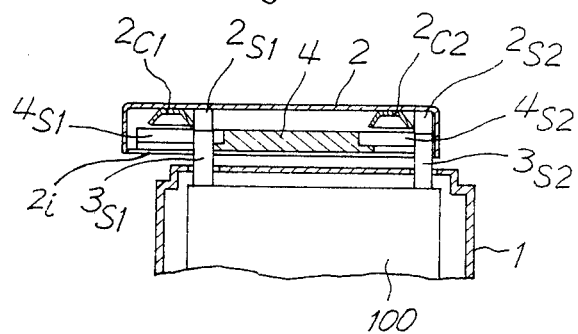
FIG. 36 is a view similar to FIG. 35C showing the device in a different operative condition.

When the pan 2 is lifted by hand a little from the position shown in FIGS. 35A, 35B and 35C, the calibration weight 4 is received by the shelves $2i$ and lifted together with the pan. Then the pan 2 with the weight 4 therein is displaced to the left as viewed in FIG. 35C and again lowered so that the studs $2s_1 \sim 2s_4$ on the pan are supported on the sensing members $3_1 \sim 3_4$ as shown in FIG. 36. Under the condition the calibration weight 4 is additionally loaded on the weighing means 100.

A retainer ring may be attached to each sensing member adjacent the top end thereof to prevent the calibration weight and the pan from falling out.

The illustrated embodiments have four sensing members. The number of the sensing members provided is not limited to four, but three or more than four sensing members may also be provided.

In accordance with the invention, since the calibration weight is arranged between the pan and the top wall of the housing, it is not necessary to provide in the housing a particular space for the calibration weight, but it is possible to have a built-in calibration weight of a large volume and consequently a large mass. This arrangement makes the balance as a whole compact in size, with increased precision and accuracy in calibration as compared with prior art balances with a built-in calibration weight in which calibration had to be conducted with a calibration weight of a small mass in comparison with the mass to be weighed.

With the arrangement that a portion of the top wall of the housing is protruded into the under recess of the pan to form in the upper portion of the interior of the housing an additional space for containing the calibration weight, it is not necessary to give much consideration to interference of the calibration weight with any other component parts of the balance in the housing, and the best use may be made of the space under the pan which would otherwise be useless.

With the arrangement that the calibration weight is loaded on and unloaded from the sensing member by moving the pan or the weight receiving member up and down by means of screws, not only the calibration weight but also the loading and unloading mechanism can be provided outside the housing, so that it is possible to provide a balance with a built-in calibration weight having a housing of substantially the same size as that of a balance without a built-in calibration weight.

With the arrangement that the pan together with the calibration weight is lifted up by hand so as to be set to either of the first and second conditions of use, that is, the condition for ordinary weighing and that for calibration, it is possible to effect manual loading and unloading of a calibration weight on and from the weighing means of the balance quickly and in a simple manner without providing a particular mechanism for the purpose. It is not necessary to provide in the housing a space for enclosing such a mechanism, but it is possible to assemble a balance having a built-in calibration weight in a housing of a compact size substantially equal to that of a balance without a built-in calibration weight. The balance of the invention is much simplified in construction, with resulting reduction in mechanical trouble and manufacturing cost.

What we claim is:

1. An electronic balance comprising:
   (a) a housing including a top wall;
   (b) weighing means enclosed in said housing;
   (c) a pan on which an object to be weighed is to be placed;
   (d) a sensing member having one end connected to said weighing means and projecting out of said top wall of said housing to have the other end connected to and supporting said pan;
   (e) a calibration weight provided under said pan; and
   (f) operating means for selectively loading and unloading said calibration weight on and from said sensing member.

2. The electronic balance of claim 1, wherein said calibration weight is of an annular shape and arranged concentrically with the axis of said sensing member; said sensing member is provided with a calibration weight receiving member; and said operating means comprises a plurality of push rods simultaneously movable selectively between a first position in which said push rods support said calibration weight so as to prevent said weight from being loaded on said weighing means and a second position in which said push rods allow said calibration weight to rest on said receiving member so that said weight is additionally loaded on said weighing means.

3. The electronic balance of claim 2, wherein said housing top wall is so shaped as to define in said housing an additional space for accommodating said calibration weight.

4. The electronic balance of claim 1, wherein said calibration weight is of an annular shape and arranged concentrically with the axis of said sensing member; said pan is provided with a calibration weight receiving member; and said operating means comprises a single member movable selectively between a first position in which said single member supports said calibration weight so as to prevent said weight from being loaded on said weighing means and a second position in which said single member allows said calibration weight to rest on said receiving member so that said weight is additionally loaded on said weighing means.

5. The electronic balance of claim 1, wherein said calibration weight is of an annular shape and arranged concentrically with the axis of said sensing member; and said operating means comprises a lever and a single push rod operable to move said lever selectively between a first position in which said lever supports said calibration weight so as to prevent said weight from being loaded on said weighing means and a second position in which said lever allows said calibration weight to rest on said receiving member so that said weight is additionally loaded on said weighing means.

6. The electronic balance of claim 1, further including means for protecting said calibration weight and the interior of said housing against dust and dirt.

7. The electronic balance of claim 1, wherein said pan is provided with a calibration weight receiving member; said calibration weight is of an annular shape and arranged concentrically with the axis of said sensing member; and said operating means comprises:
   (a) an annular member carrying said calibration weight thereon so as to be rotatable therewith and being provided with a circumferential groove, the bottom surface of which is undulated; and
   (b) an upright circumferential wall formed on said housing top wall concentrically with the axis of said sensing member and said pan supported thereon, and having substantially the same diameter as that of said annular member and an upper surface undulated complementarily to said undulated bottom surface of said groove; said circumferential wall engaging in said groove of said annular member so that said annular member with said reference weight is rotatably mounted on said circumferential wall.

8. The electronic balance of claim 1, wherein said pan is provided with a calibration weight receiving member; said calibration weight is of an annular shape and arranged concentrically with the axis of said sensing member; and said operating means comprises:
   (a) an upright circumferential wall formed on said housing top wall concentrically with the axis of said sensing member and said annular calibration weight, and having a circumferential upper surface undulated to have a plurality of waves equidistantly spaced apart; and (b) a plurality of pins projecting radially outwardly from said calibration weight and adapted to be supported slidably on said undulated circumferential upper surface so that said calibration weight is supported rotatably on said upright circumferential wall.

9. The electronic balance of claim 1, wherein said sensing member is provided with a calibration weight receiving member; said calibration weight is of an annular shape and arranged concentrically with the axis of said sensing member; and said operating means comprises;

(a) an upright circumferential wall formed on said housing top wall concentrically with the axis of said sensing member and said calibration weight, and having a first circumferential upper surface portion and a second undulated circumferential upper surface portion which is of a smaller height than said first upper surface portion;

(b) a plurality of pins projecting radially outwardly from said calibration weight and supported slidably on said second undulated circumferential upper surface portion so that said reference weight is supported rotatably on said upright circumferential wall;

(c) a dust cover extending over said calibration weight and supported rotatably on said first circumferential upper surface portion;

(d) a fork-like member fixed to said dust cover and having a slot in which one of said pins engages, said slot having a width greater than the diameter of said pin engaging therein; and (e) a handle radially outwardly extending from said dust cover.

10. The electronic balance of claim 1, wherein said pan is provided with a calibration weight receiving member; said calibration weight is of an annular shape and arranged concentrically with the axis of said sensing member; and said operating means comprises;

(a) a first upright circumferential wall formed on said housing top wall concentrically with the axis of said sensing member and said calibration weight, and having an undulated circumferential upper surface;

(b) a member fixed to said calibration weight and having a downwardly facing surface undulated complementarily to said undulated circumferential upper surface;

(c) a second upright circumferential wall formed on said housing top wall concentrically with said first upright circumferential wall, and having a larger diameter than said calibration weight and a greater height than said first upright circumferential wall;

(d) a dust cover extending over said calibration weight and supported rotatably on said second upright circumferential wall;

(e) a recess formed in the circumferential surface of said calibration weight;

(f) a pin fixed to said dust cover and engaging in said recess, the diameter of said pin being smaller than the width of said recess; and (g) a handle radially outwardly projecting from said cover.

11. The electronic balance of claim 10, further including resilient means provided adjacent said handle so that when said handle is manually turned to rotate said dust cover on said second upright circumferential wall thereby to rotate said calibration weight through engagement of said pin in said recess, said handle acts on said resilient means so that when said handle is released, said resilient means pushes said handle back thereby to rotate said dust cover slightly in the reverse direction relative to said calibration weight.

12. The electronic balance of claim 1, wherein said pan is provided with a central boss having an axial bore in which the top end of said sensing member is fitted; said calibration weight is of an annular shape and arranged concentrically with said sensing member; and said operating means comprises;

(a) an external thread formed on the outer circumferential surface of said boss;

(b) an upright circumferential wall formed on said housing top wall concentrically with said sensing member and said calibration weight; and (c) a weight receiving member having an internal thread engaging said external thread, and an arm extending under said pan and said calibration weight radially outwardly thereof;

(d) whereby as said weight receiving member is rotated relative to said pan, said calibration weight is moved by said weight receiving member selectively between a first position in which said calibration weight rests on said upright circumferential wall and is kept out of contact with said calibration weight receiving member and said pan and a second position in which said calibration weight is lifted by said calibration weight receiving member out of contact with said upright circumferential wall so as to be additionally loaded on said sensing member.

13. The electronic balance of claim 1, wherein said pan is provided with a circumferential skirt; said calibration weight is of an annular shape and arranged concentrically with said sensing member; and said operating means comprises;

(a) an internal thread formed on the inner circumferential surface of said skirt;

(b) an upright circumferential wall formed on said housing top wall concentrically with said sensing member and said calibration weight; and (c) an annular weight receiving member provided with an upright circumferential wall having an external thread engaging said internal thread of said skirt of said pan to define a space in which said calibration weight is enclosed;

(d) whereby as said weight receiving member is rotated relative to said pan, said calibration weight is moved by said weight receiving member selectively between a first position in which said calibration weight rests on said upright circumferential wall and is kept out of contact with said calibration weight receiving member and said pan and a second position in which said calibration weight is lifted by said calibration weight receiving member out of contact with said upright circumferential wall so as to be additionally loaded on said sensing member.

14. The electronic balance of claim 1, wherein said pan is provided with a central boss having an axial bore; said calibration weight is of an annular shape and arranged concentrically with said sensing member; and said operating means comprises:

(a) an internal thread formed on the inner surface of said axial bore of said boss;

(b) a pan supporting member fixed to the top end of said sensing member and having an external thread engaging said internal thread;

(c) an upright circumferential wall formed on said housing top wall concentrically with said sensing member and said calibration weight; and (d) a weight receiving member fixed to said pan;

(e) whereby as said pan is rotated relative to said pan supporting member, said pan is moved selectively between a first position in which said calibration weight rests on said upright circumferential wall and is kept out of contact with said calibration weight receiving member and said pan and a second position in which said reference weight is lifted by said reference weight receiving member out of contact with said upright circumferential wall so as to be additionally loaded on said sensing member.

15. The electronic balance of claim 14, wherein said calibration weight receiving member comprises an annular member covering the underside of said pan to define a space in which said calibration weight is disposed.

16. The electronic balance of claim 1, wherein said pan is provided with a central boss having an axial bore; said calibration weight is of an annular shape and arranged in an opening formed in said housing top wall and concentrically with said sensing member; and said operating means comprises:

(a) an external thread formed on the top end portion of said sensing member;

(b) a pan supporting member fitted in said axial bore of said boss and having an internal thread engaging said external thread;

(c) a plurality of calibration weight supporting tongues provided on the circumference of said opening in said housing top wall; and (d) a weight receiving member fixed to said boss;

(e) whereby as said pan is rotated relative to said sensing member, said pan is moved selectively between a first position in which said calibration weight rests on said calibration weight supporting tongues and is kept out of contact with said pan and said calibration weight receiving member and a second position in which said calibration weight is lifted by said calibration weight receiving member out of contact with said calibration weight supporting tongues so as to be additionally loaded on said sensing member;

said electronic balance further including;

(f) an upright circumferential wall surrounding said opening formed in said housing top wall; and (g) a dust cover supported on said upright circumferential wall to cover said calibration weight.

17. The electronic balance of claim 1, wherein said operating means comprises:

(a) an upright circumferential wall formed on said top wall of said housing concentrically with said sensing member and said calibration weight;

(b) a weight receiving member fixed to said sensing member; and (c) means for moving said sensing member with said pan mounted thereon selectively between a first position in which said calibration weight rests on said upright circumferential wall and is kept out of contact with said calibration weight receiving member and a second position in which said calibration weight is lifted by said calibration weight receiving member out of contact with said upright circumferential wall so as to be additionally loaded on said sensing member.

18. The electronic balance of claim 1, wherein said calibration weight is of a rectangular shape; said sensing member has four supports arranged at the four corners of a rectangule and each provided with a calibration weight receiving ledge; and said operating means comprises a plurality of push rods simultaneously movable between a first position in which said push rods lift said calibration weight out of contact with said ledges and a second position in which said push rods allow said calibration weight to rest on said calibration weight receiving ledges so as to be additionally loaded on said sensing member.

19. The electronic balance of claim 1, wherein said pan includes a top plate and a skirt portion to define a recess under said top plate; said housing has a portion of its top wall protruded into said recess to provide an additional space in said housing; said calibration weight is of an annular shape and arranged in said additional space concentrically with said sensing member; and said operating means comprises:

(a) an undulation formed on the peripheral portion of the under surface of said calibration weight;

(b) a recess formed in the circumferential surface of said calibration weight;

(c) an annular calibration weight supporting member having substantially the same diameter as that of said calibration weight and an upper peripheral surface portion undulated complementarily to said undulation on said calibration weight, said supporting member being arranged in said additional space so that said calibration weight may slidably ride on said annular supporting member; and (d) a lever rotatable about said sensing member and provided with a tongue engaging in said recess.

20. An electronic balance comprising;

(a) a housing including a top wall;

(b) weighing means enclosed in said housing and provided with a plurality of sensing members projecting through said top wall and having their respective free ends outside said housing;

(c) a pan on which an object to be weighed is to be placed and having a top plate and a skirt portion to define a space under said top plate;

(d) a calibration weight provided in said space; and (e) a plurality of supports provided on the outer surface of said top wall of said housing;

(f) whereby in a first condition of use said pan is placed on said free ends of said sensing members, with said calibration weight being held in said space under said pan out of contact with said pan and said sensing members, and in a second condition of use one of said pan and said calibration weight supports the other and is supported on said free ends of said sensing members, so that said pan and said calibration weight can be manually set selectively to either of said first and second conditions.

21. The electronic balance of claim 20, wherein said setting of said pan and said calibration weight is effected by manually displacing said pan and said calibration weight from their previous position in one of said first and second conditions lengthwise of said pan.

22. The electronic balance of claim 20, wherein said setting of said pan and said calibration weight is effected by manually displacing said pan and said calibration weight from their previous position in one of said first and second conditions widthwise of said pan.

23. The electronic balance of claim 20, wherein said setting of said pan and said calibration weight is effected by manually rotating said pan and said calibration weight a predetermined angle from their previous position in one of said first and second conditions.

24. The electronic balance of claim 20, wherein said setting of said pan and said calibration weight is effected by manually turning said pan and said calibration weight upside down.

* * * * *